United States Patent
Azar et al.

(10) Patent No.: US 8,370,639 B2
(45) Date of Patent: Feb. 5, 2013

(54) SYSTEM AND METHOD FOR PROVIDING SECURE ACCESS TO AN ELECTRONIC DEVICE USING CONTINUOUS FACIAL BIOMETRICS

(75) Inventors: Cyrus Azar, Spokane Valley, WA (US); George Brostoff, Covert, MI (US)

(73) Assignee: Sensible Vision, Inc., Covert, MI (US)

( * ) Notice: Subject to any disclaimer, the term of this patent is extended or adjusted under 35 U.S.C. 154(b) by 1062 days.

(21) Appl. No.: 11/154,879

(22) Filed: Jun. 16, 2005

(65) Prior Publication Data

US 2006/0288234 A1  Dec. 21, 2006

(51) Int. Cl.
*G06F 21/00* (2006.01)

(52) U.S. Cl. ....................................................... 713/186

(58) Field of Classification Search .................... 713/186
See application file for complete search history.

(56) References Cited

U.S. PATENT DOCUMENTS

| | | | |
|---|---|---|---|
| 5,229,764 A * | 7/1993 | Matchett et al. | 340/5.52 |
| 5,280,530 A * | 1/1994 | Trew et al. | 382/103 |
| 5,892,856 A * | 4/1999 | Cooper et al. | 382/291 |
| 6,070,240 A | 5/2000 | Xydis | |
| 6,111,517 A * | 8/2000 | Atick et al. | 340/5.83 |
| 6,160,903 A * | 12/2000 | Hamid et al. | 382/115 |
| 6,181,803 B1 * | 1/2001 | Davis | 382/115 |
| 6,182,221 B1 | 1/2001 | Hsu et al. | |
| 6,377,699 B1 | 4/2002 | Musgrave et al. | |
| 6,434,259 B1 * | 8/2002 | Hamid et al. | 382/115 |
| 6,532,298 B1 | 3/2003 | Cambier et al. | |
| 6,650,322 B2 * | 11/2003 | Dai et al. | 345/212 |
| 6,651,168 B1 * | 11/2003 | Kao et al. | 713/185 |
| 6,657,538 B1 | 12/2003 | Ritter | |
| 6,724,919 B1 | 4/2004 | Akiyama et al. | |
| 6,810,480 B1 * | 10/2004 | Parker et al. | 713/186 |
| 6,819,219 B1 | 11/2004 | Bolle et al. | |
| 6,831,993 B2 | 12/2004 | Lemelson et al. | |
| 6,853,739 B2 * | 2/2005 | Kyle | 382/115 |
| 6,958,676 B1 * | 10/2005 | Morgan et al. | 340/5.72 |
| 6,993,166 B2 * | 1/2006 | Lo et al. | 382/124 |
| 7,039,221 B1 * | 5/2006 | Tumey et al. | 382/118 |
| 7,461,264 B2 * | 12/2008 | Chen | 713/182 |
| 7,602,947 B1 * | 10/2009 | Lemelson et al. | 382/116 |
| 7,634,662 B2 * | 12/2009 | Monroe | 713/186 |
| 7,774,851 B2 * | 8/2010 | Singh et al. | 726/26 |
| 2001/0026634 A1 | 10/2001 | Yamaguchi | |
| 2003/0115473 A1 * | 6/2003 | Sugimura et al. | 713/186 |

(Continued)

OTHER PUBLICATIONS

Acsys Biometrics Corp. web page re Versashield; copyright 2003.

*Primary Examiner* — Edan Orgad
*Assistant Examiner* — James Turchen
(74) *Attorney, Agent, or Firm* — Barnes & Thornburg, LLP

(57) ABSTRACT

A facial biometric recognition system and method (100) for providing security for an electronic device (101) includes a digital camera (105) having a field of view for providing facial biometric images at a predetermined interval from a user of the electronic device (101). A processor (109) is associated with the electronic device (101) for comparing the facial biometric images to biometric image data stored in a database (107). The facial biometric images are continuously compared (111) to those stored in the database (107) or to facial image tracking (113) for providing substantially continuous authentication when the user physically moves about the camera's field of view. The invention may be used with devices such as a personal computer (PC), mobile telephone, personal digital assistant (PDA) or gaming device and provides an efficient means by which to secure information on the device without the need for complex biometric security devices.

63 Claims, 6 Drawing Sheets

U.S. PATENT DOCUMENTS

| | | |
|---|---|---|
| 2003/0142849 A1 | 7/2003 | Lemelson et al. |
| 2003/0161507 A1 | 8/2003 | Lawandy |
| 2004/0032975 A1 | 2/2004 | Boccacci |
| 2004/0042643 A1 | 3/2004 | Yeh |
| 2004/0062423 A1 | 4/2004 | Doi |
| 2004/0088553 A1 | 5/2004 | Levin et al. |
| 2004/0098598 A1 | 5/2004 | Wolfram |
| 2004/0117638 A1 * | 6/2004 | Monroe ........................ 713/186 |
| 2005/0041840 A1 | 2/2005 | Lo |
| 2005/0057339 A1 | 3/2005 | Ikehara et al. |
| 2006/0023915 A1 * | 2/2006 | Aalbu et al. .................... 382/103 |
| 2008/0130961 A1 * | 6/2008 | Kinoshita ...................... 382/118 |

* cited by examiner

SYSTEM AND METHOD FOR PROVIDING SECURE ACCESS TO AN ELECTRONIC DEVICE USING CONTINUOUS FACIAL BIOMETRICS

TECHNICAL FIELD

This invention relates in general to electronic security and more particularly to a method using facial biometrics to continuously authenticate a user for controlling access to an electronic device.

BACKGROUND

Many electronic devices such as personal computers, mobile devices including phones and personal digital assistants (PDAs) use some form of authentication, typically a password that must be input into the device to gain access. The password is most often typed onto a keyboard or other interface which then allows the user to gain partial or full access to the utility of the device and/or network. A problem associated with using passwords is that they are time consuming and inconvenient for the user to enter. Users often use informal passwords or share their password with others which works to compromise system security. These practices negate the password's value and make it difficult to have an accurate auditing of access. Moreover, passwords are expensive to administer when forgotten or misplaced. Although the use of other types of security access systems such as voice recognition, fingerprint recognition or iris scans have been implemented, these types of systems require a different procedure to access and use the device. These techniques also require a specific and time-consuming enrollment process in order to be operational.

Additionally, radio frequency (RF), infrared (IR), and ultrasonic transmitter devices have also been used as proximity-type devices to allow access when the transmitter is in a predetermined range of the device. The problem associated with these types of systems is the transmitter must be continuously worn or otherwise carried by the user. Should the transmitter signal be lost, misplaced or become inoperative, the user will no longer have any access to the device. Moreover, if another user has possession of the transmitter, the other user gains full access to the device. Obviously, this can lead to all types of security issues should the transmitter be lost or stolen.

Finally, biometric authentication using facial recognition is also often used to gain access to electronic devices. U.S. Pat. No. 6,853,739 to Kyle and U.S. Pat. No. 6,724,919 to Akiyama et al., which are both herein incorporated by reference, disclose examples of identity verification systems wherein a database is employed to compare facial features of a user to those in the pre-established database. Once a comparison is made, then authentication is verified and access is granted to the system. The disadvantage of this type of system is the requirement of a separate and specific enrollment procedure by the user to create the database. As with this type of facial recognition system and others in the prior art, the database must be populated before being used; otherwise, the system will not operate. This puts an unnecessary burden on the system operator, requiring detailed education on the steps to populate the database before the system may become operational. Additionally, this type of security system does not permit the automatic updating of the database to accommodate changes in head position, user features (such as different glasses), a change in the camera's operational characteristics, lighting and other environmental factors. This can limit the speed, accuracy, and even the success of database matching (recognition). Also, these prior art facial recognition and other biometric systems operate only at the instant of authentication.

Thus, these systems have no way of confirming the identity of the user even milliseconds after the actual authentication. The device has no way of knowing when a user has stepped away from the device, leaving the device unsecured. Existing methods of locking based on inactivity of data entry, such as keyboard or mouse activity, do not provide the needed flexibility. If they are set to lock on a very short delay, the user is locked out as the user is using the device. Conversely, if the delays are set long enough to not impact the user, the device is vulnerable to unauthorized access when the user steps away.

Hence, the need exists to provide a system and method for providing secure access to an electronic device using facial recognition that provides continuous authentication, no special enrollment process, automatic updates to the biometric database to improve recognition performance and multi-factor authentication while not requiring unnecessary data processing. The recognition system and method should be capable of running on devices requiring relatively low computing power so as to provide an inexpensive and responsive approach to providing biometric user authentication with a high level of security.

DETAILED DESCRIPTION OF THE PREFERRED EMBODIMENT

Figure 1:
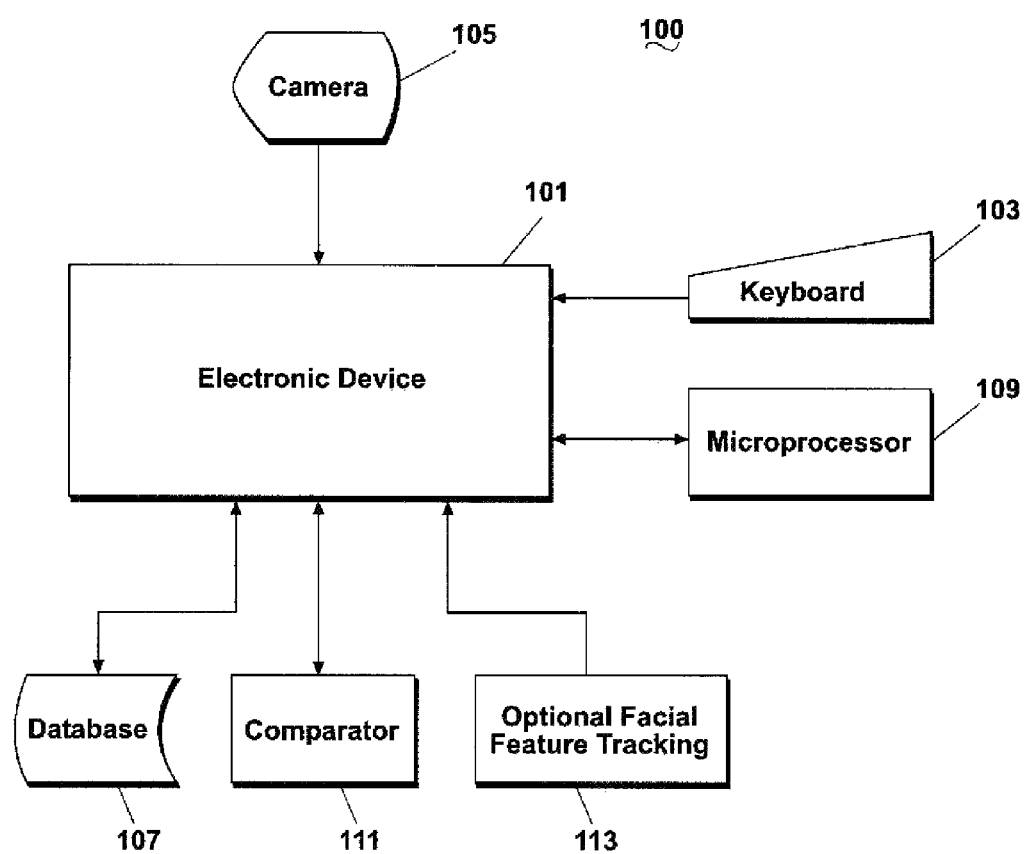
FIG. 1 is a block diagram showing the topology of the system and method of the invention wherein a camera is used to provide user system authentication.

The invention closes a fundamental security hole that exists in many forms of existing security authentication for all types of electronic devices that require secure access. Existing security methods only confirm the user at the moment the user enters his or her password, scans his or her fingerprint, or iris, etc. The system has no ability to discern whether the current user is the same individual who authenticated even a few milliseconds earlier. This leaves the device completely unsecured and vulnerable until it is logged off or locked. It only takes a few moments for persons having malicious intent to steal and/or delete data from a device from which the user has already logged in. The existing solution is to require the user to manually lock/logoff, or create user inactivity timers to lock or logoff a user.

In addition, most information technology (IT) organizations resist change because they prefer not to risk changes that would affect their existing hardware/software systems. Also, they prefer not to expend the support costs necessary for implementing a solution. Support costs for training users and answering help desk questions can be significant factors. The present invention automates the database creation in way that is transparent to the end user. The invention requires little training with minimal "help desk" costs. The invention utilizes an auto-enrollment feature that permits the device to automatically update a database to constantly improve the quality of the user recognition. In contrast, current biometric products require a special set of steps to establish and update the database. In some cases, these steps can be performed by the user only after a learning orientation. In many cases, an IT administrator must work with the user to actually train the database before it can be used in the system.

Security compliance is also a major problem often requiring users to manually lock or logoff their computers when stepping away from them. This process is time consuming, cumbersome and is secondary to the user's purpose in using the computer. Moreover, locking or logging off requires the user to enter a password when the user returns to the device which is a major inconvenience. Unless rigorously enforced, users will typically ignore the proper security procedures. Short of direct observation, there is essentially no way for a system administrator to confirm that users are properly following a prescribed security policy.

One impractical solution has often involved the use of a timer. The timer works by locking the device when there is no peripheral activity within a predetermined time period. As will be recognized by those skilled in the art, the peripherals may include, but are not limited to, a mouse, keyboard or touch screen. If a timer is set to a short enough duration to reasonably close a security hole when the user steps away, the device will lock when the user is reviewing data on the screen. The user is then constantly inputting his or her credentials each time the system locks or logs the user off. This causes frustration for the user and greatly reduces productivity. As a result, typical inactivity times are at least 2-5 minutes, which provides a huge window of vulnerability. In addition, inactivity timers are ineffective. All an unauthorized user must do is access the system within the timer period. After that, the unauthorized user can continue working indefinitely.

The system and method of the present invention directly address these compliance issues by automating the process, thus ensuring complete compliance. Since the process is automated and transparent to the operator, user acceptance is very high. The users find the system is more convenient to use than before the installation of the present invention. Additionally, system audit logs showing persons who accessed the device are now accurate because of this continuous authentication security process. The invention operates by instantly locking/logging off when the user is out of view of the device and then unlocking as soon as the user reappears in front of the computer.

Referring now to FIG. 1, the system as used in accordance with the present invention includes an electronic device 101 including, but not limited to, a personal computer, mobile telephone, alpha numeric paging device, personal digital assistant (PDA), electronic gaming device or the like which require some type of authentication to gain access to the utility of the device 101. A camera 105 may also be used to add an additional level of security to the device where the camera is used in connection with the device 101 to populate an internal database 107 with a plurality of image vectors. The camera provides substantially real-time images and typically runs at a rate of approximately 5-10 frames per second for continuously supplying digital image data to the electronic device 101. The camera is used in connection with an optional facial feature tracking software typically used within the device that works to track the movement of the user's face while in a position in front of the camera. Thus, as the user moves his head back and forth or side to side while using the device, the software used in connection with the camera will track this facial movement to allow continuous authentication while using low CPU and device resources 113.

Those skilled in the art will recognize that the camera 105 may be integrated into the electronic device 101 or it may stand alone as an accessory or peripheral, sending image data to the electronic device through a wired or wireless connection. As described in connection with the preferred method of the invention, a microprocessor 109 is then used with a comparator 111 for making a determination whether images continuously supplied by the camera 105 are human facial images. If a human facial image is detected, it is determined whether this image matches any of those stored in the database 107 from previous user sessions. Each vector represents a numerical representation of a digital image sent from the camera 105 to the electronic device 101. As will be discussed herein, the electronic device 101 makes a comparison between a vector established in the database 107 with a current vector provided by the camera 105. When a match is affirmatively established and the user is authenticated, the system 100 may be configured to allow a user either full or limited access to the electronic device 101.

Figure 2:
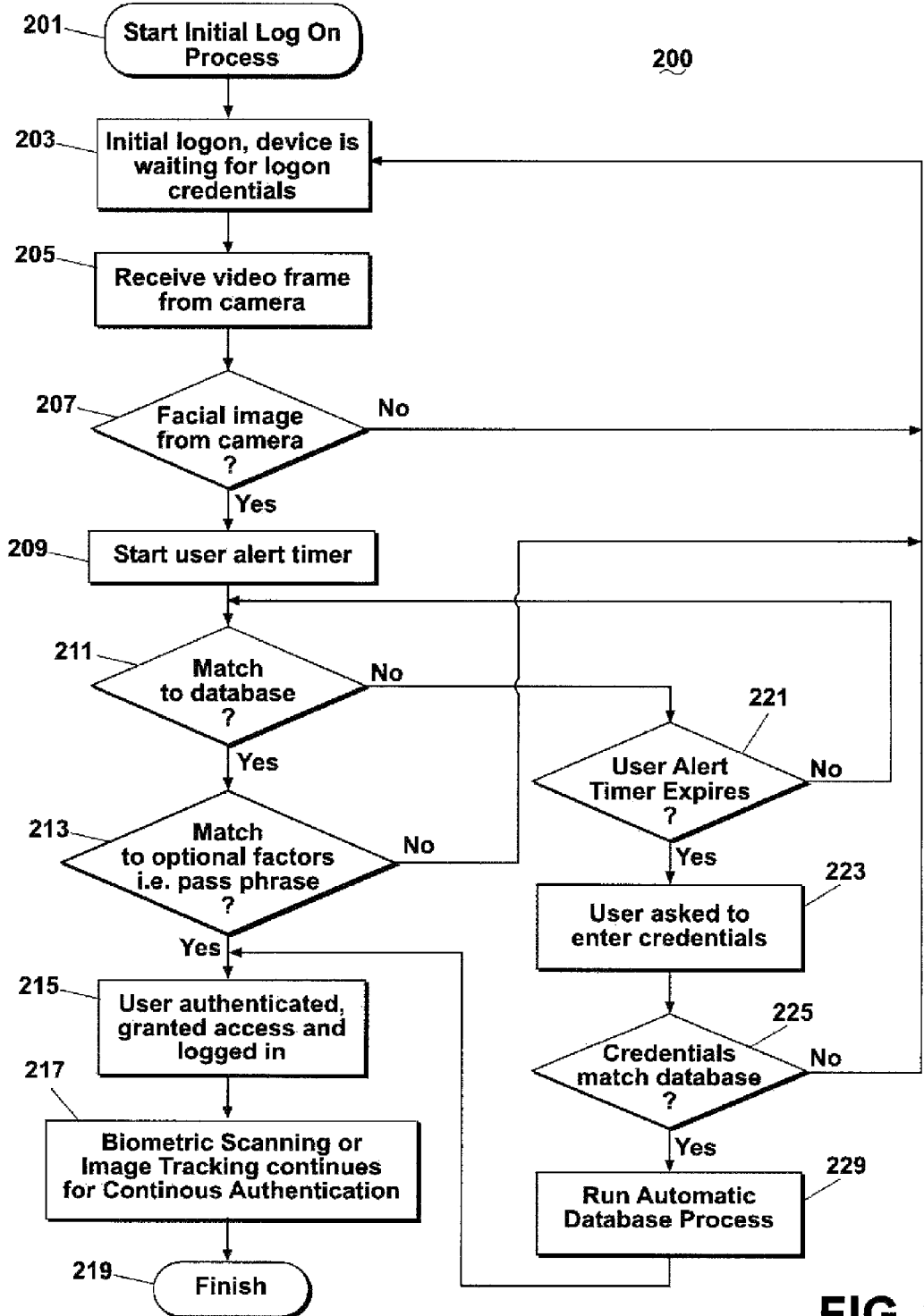
FIG. 2 is a flow chart diagram illustrating an overview of the method using facial biometrics.

FIG. 2 is a flow chart diagram illustrating an overview of the facial biometric method 100 of an embodiment of the present invention. Although this method is depicted as a sequence in FIG. 2, it will be evident to those skilled in the art that other iterations and definitions are possible without departing from the spirit and scope of the present method. These methods may include, but are not limited to, two-dimensional (2D), three-dimensional (3D), IR and/or other facial recognition techniques. In the method for the facial biometric overview 200, the initial startup process for logging on to the device is initiated 201, and the device displays a screen 203 allowing the user to supply his or her login password or other authentication credentials. A video frame is received 205 from the camera associated with the device whereby the device then determines 207 whether the image data received from the camera is a facial image using face detection. If it is not a facial image, the device then continues to wait 203 for the user's login credentials. However, if the image data is a facial image, a user alert timer is started 209. The user alert timer is used to establish some predetermined time within which the user should be authenticated before a message is displayed to the user to request the user to manually input his or her credentials. The expiration of the user alert timer has no effect on authentication other than to recommend to the user to login manually since the authentication process has exceeded an expected duration and the system would benefit from a database update. Thus, the camera frames continue to be evaluated even if the user is requested to enter a password. The system may be able to identify users as they are entering their credentials, speeding their access. So long as the user remains in front of the device, the system and method of the invention attempts to perform a database match. Even after authentication has occurred, each camera frame is evaluated utilizing this continuous authentication feature.

After the image from the camera is converted to an image vector, the device then determines 211 if the vector has any match to one already established in the database. If no match occurs and the user alert timer has not expired 221, then the device continues to process new incoming image vectors with those in the database to determine whether a match occurs. If the user alert timer has expired, the user is then requested 223 for his log-in credentials which may be input using a keyboard onto which the user can manually input a password or other credentials or, alternatively, another type of interface such as other biometric methods. Concurrently, the device continues to scan new incoming images/vectors for a match to the database 211. If at any time there is a match to the database 211, the system will proceed to match to optional factors 213. If the credentials input by the user do not match those stored in the database, the process starts again whereby the device waits for initial login credentials from the user 203 and scanning for vectors continues. However, if the credentials do match those in the database and match the optional factors authentication factors 213, then the automatic database process is initiated which will be discussed with regard to FIG. 3. In the event that a match does occur between the current vector received from the camera and one stored in the database before the user alert timer 221 expires, then the user may be prompted for one or more additional authentication factors such as a pass phrase or a second password that provides an optional additional factor for authentication. If the user fails to provide this pass phrase or if the pass phrase does not match that in the database, the system returns to the start, the user alert timer is reset and the initial logon screen 203 is displayed.

Once the user is authenticated, the user is then granted access 215 and logged into the device for full or limited use of its features. An inventive aspect of the present invention, as compared to the prior art, is that the user is 217 is continuously scanned and authenticated once the user has gained access. Those skilled in the art will recognize that this continuous authentication process enables the user to step away from the device, allowing the viewing screen to be disabled so images present on the screen or monitor are no longer able to be viewed and data entry locked. Thus, text, images or other data presently displayed on the device may be easily secured when the user moves from the camera's field of view. Once the user again steps back into the camera's view, the method of the present invention provides for re-authentication of that user. Once re-authentication is established, the display and data entry are unlocked, allowing instant access to the device in the same state as when the user stepped from view.

In typical use, while a personal computer is secured using this method, the application software running on the device is unaffected and continues to run on the device, although with no display. However, the method of the invention allows the user to select to what extent the device will be affected when the device becomes locked or unlocked. Thus, the user may determine to have the device: 1) locked; 2) unlocked; 3) logon on; or 4) logged off, using this method. The "locking" of the device provides a secure desktop without disconnecting the user from a document or email server and without shutting down any application software running on the device. The display, keyboard and/or mouse on the device may be disabled while the user is not present within the camera's view. Once the user steps back into the field of view, the method provides for re-authentication. Once this security is reestablished, the device's display is again enabled for use. Hence, this process provides a simplified means of maintaining security of a personal computer or other device while the user is situated outside the camera's field of view. Since facial biometrics are used and the user is continuously authenticated, the user can be assured that data displayed on the device and access to the network will be secure when the user steps away from a work station for a moment or longer periods of time.

Figure 3:
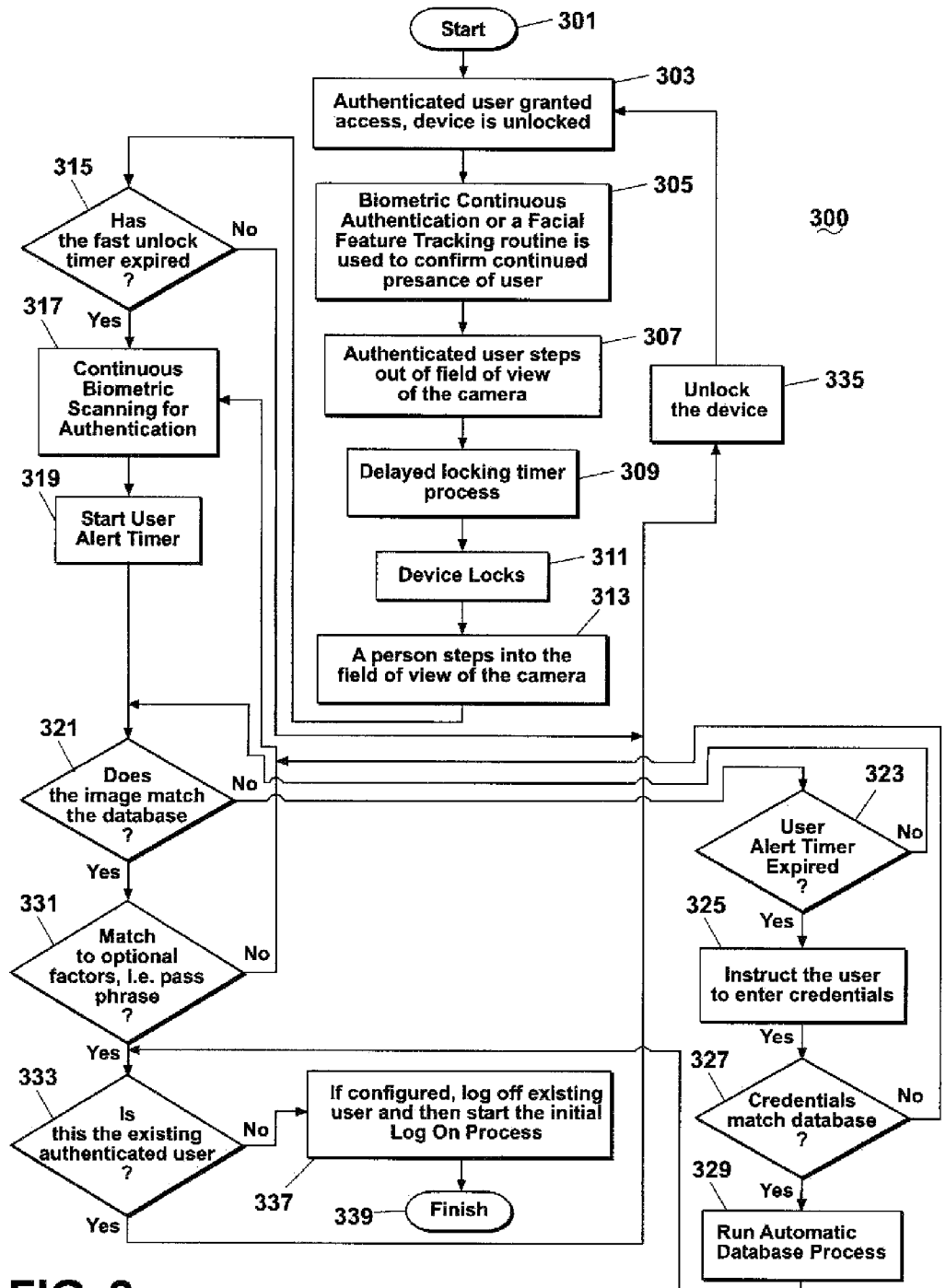
FIG. 3 is a flow chart diagram illustrating a continuous authentication routine used in accordance with an embodiment of the invention.

FIG. 3 is a flow chart diagram illustrating the continuous authentication routine as briefly described in FIG. 2. The continuous authentication process is a key feature of the invention since it allows the user to be easy re-authenticated after stepping from the camera's field of view. The continuous authentication process 300 begins 301 when an authenticated user is granted access and the device is unlocked 303. A biometric re-authentication or facial feature tracking routine is used to confirm 305 that the user remains present in the camera's field of view. Re-authentication of the user's face allows the highest degree of security while keeping the system unlocked. Conversely, Facial Feature tracking allows high security with low CPU resources by tracking the authenticated user's features. Facial Feature Tracking and continuous authentication is discussed herein with regard to FIG. 5.

If an authenticated user steps out of the field of view of the camera 307, an optional delayed locking timer process is initiated 309. The delayed locking timer process will be more fully described with regard to FIG. 5. After this process is complete, the device is locked 311. If a user does step into the field of view of the camera 313, a determination is made whether the optional fast unlock timer has expired 315. If used, the fast unlock timer is typically brief, usually 1-10 seconds. If the fast unlock timer has not expired, the device is unlocked 335 with the presence of any face rather than the recognition of a specific face. If the fast lock timer has expired, the device resumes 317 continuous biometric scanning for authentication. The user alert timer is restarted 319, and it is determined whether the image from the camera matches 321 a vector stored in the database. If the camera image does not match any stored image then it is determined whether the user alert timer has expired 323. If not, the process continues where the image is matched 321 against those in the database. If the user alert timer has expired, biometric scanning and database matching continues and the current user is requested 325 for his or her authentication credentials. If there is a match, the automatic database process is started 329 as more fully described in FIG. 4. If a database match is made before the user enters his or her credentials but the user alert timer has expired, the automatic database process 329 is executed. At the completion of the automatic database process, the user will be considered authenticated. The system will either unlock the device 335, or optionally logoff an existing user 337 who had locked the computer. The system will then automatically log on the new user to the user's account without any additional authentication.

If an image does initially match one that is in the database 321, the user may optionally be prompted 331 for additional authentication factors such as a pass phrase or other type of password. If there is no match for the additional authentication factors, the ongoing biometric scanning is continued 317. If there is a match, a determination 333 is made whether this is the existing authenticated user who may have just momentarily stepped from the field of view. If it is the existing authenticated user, the device is unlocked 335. If it is not the existing user, the device may be configured to log off 337 the existing user and start the initial log-in process 301 at which point the continuous authentication routine is completed 339.

Figure 4:
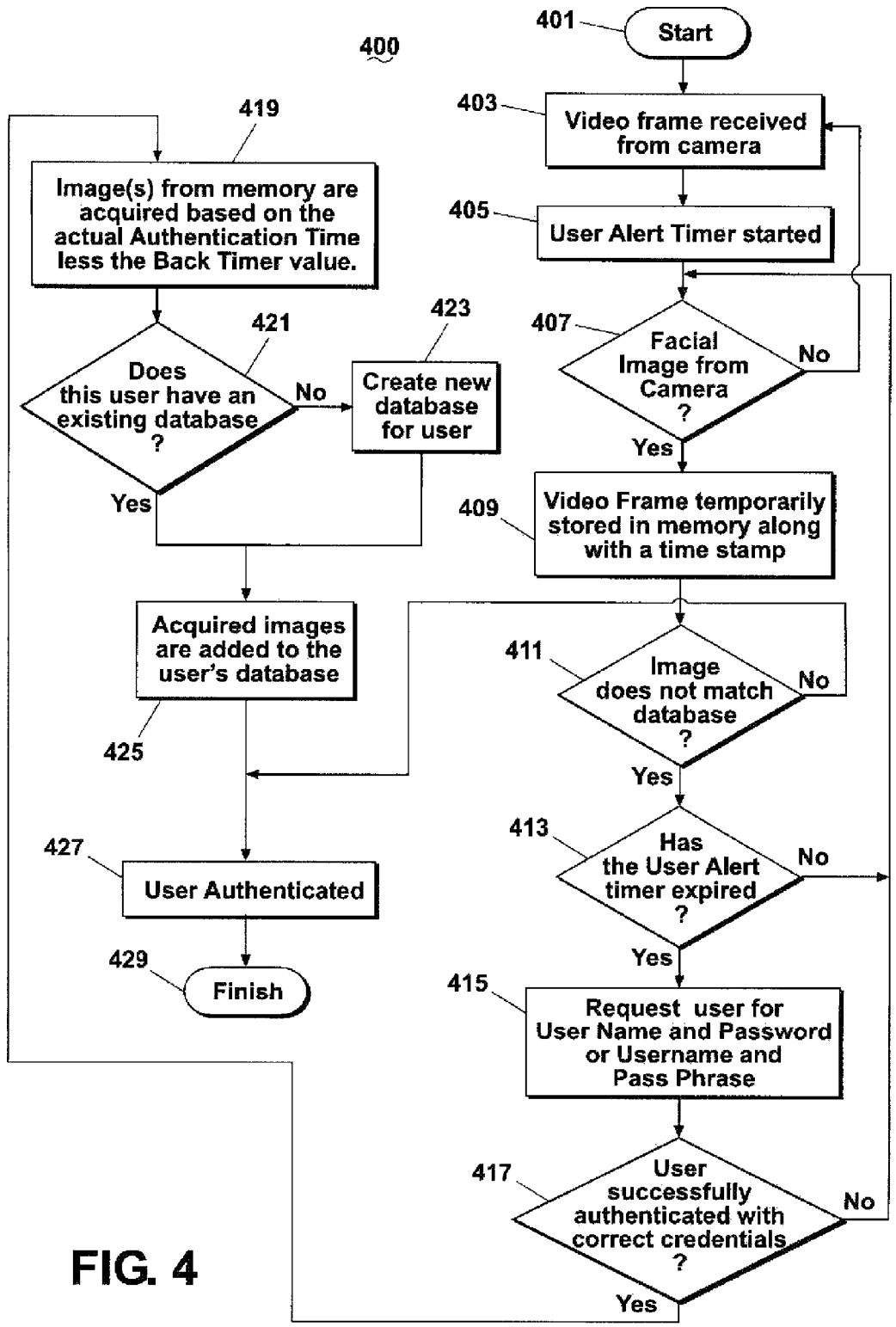
FIG. 4 is a flow chart diagram illustrating a back-timing process used with the automatic database in accordance with an embodiment of the invention.

FIG. 4 is a flow chart diagram illustrating the process for populating the database together with a back timer process 400 that can be used to improve the quality of the vectors in the database. The automatic database is a process by which the system database will be created or updated while a user uses the system and enters a password, or a database match occurred after the user alert timer expired. Although a password may initially be required, an objective of the automatic database is to permit the data to be populated through actual use rather than a specific enrollment procedure, whereby a user can eventually stop using password authentication and the method of the invention can be employed to authenticate using facial biometric data. By updating the database whenever it has taken too long a period of time for the database matching, the quality of the database is improved and the amount of time for subsequent database matches decreases. This also accommodates the various physical changes to a user's face over time, including ageing, changes in glasses, color of the skin (tanning), the position of the user's head relative to the camera, changing camera characteristic, and various environmental conditions including lighting. The purpose of the back timer process is to update the database with one or more images from a time previous to the actual recognition or authentication event. This permits the system to acquire higher quality images that closely match the head position of the user when the user is first accessing the device.

The automatic database and back timer process starts 401 when a video frame is received 403 from the camera. The user alert timer is started 405 and a determination is made 407 whether the image is a facial image. If it is not a facial image, the routine returns to receiving a video 403. Once a facial image is detected, the video frame is temporarily stored 409 in memory along with a time stamp. The time stamp denotes the actual time the facial image was processed by the camera. A comparison is made 411 to determine whether the image matches another image vector in the database. If a match occurs, then the user is authenticated 427. If no match occurs, a determination is made 413 whether the user alert timer has expired. If the user alert timer has not expired, the image is then reviewed 407 to determine whether it is a facial image. If the user alert timer has expired, the user is requested 415 for the user's name and password, pass phrase or the like. If the user is not authenticated with the correct credentials 417, the image is again reviewed 407 to determine whether it is a facial image. If the user is authenticated, then images from memory are acquired 419 based on the actual authentication time less the back timer value. Since video frames are still received 403 and database matching 411 continues while the user is requested to enter his or her credentials, the system may make a database match and proceed to User Authenticated 407 even as the user is entering his or her credentials. It is next determined 421 whether the user has preexisting images in the database. If the user does not have a preexisting image in the database, a new database is created 423 for that user. Subsequently, once the new database is created or preexisting images are available, the acquired images are added 425 to the user's database. The user is then authenticated 427 and the process is completed 429.

Figure 5:
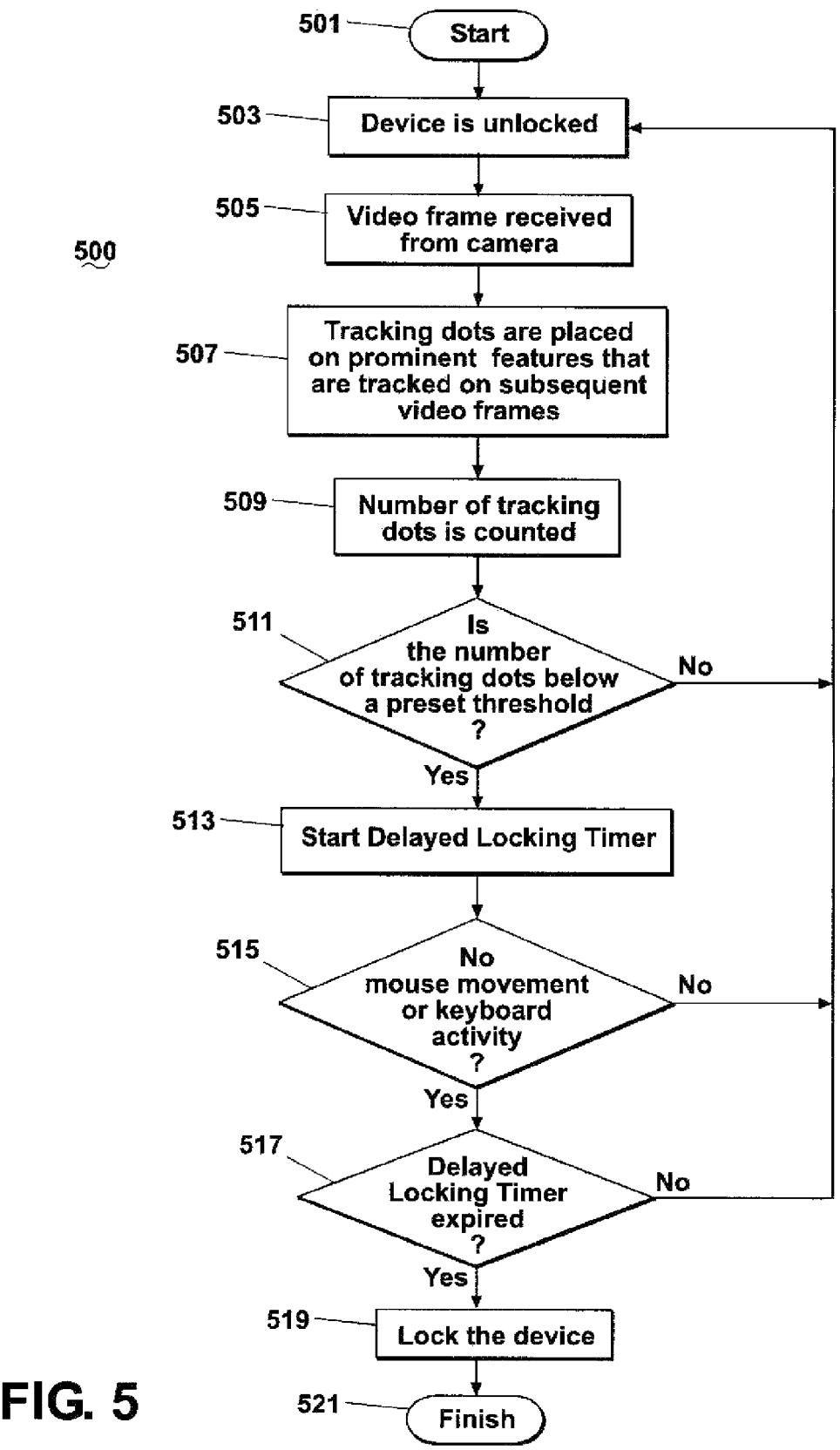
FIG. 5 is a flow chart diagram illustrating facial feature tracking and a delayed lock subroutine as used in accordance with an embodiment of the invention.

FIG. 5 is a flow chart diagram illustrating a continuous facial feature tracking and delayed lock process 500 as used for the continuous authentication embodiment of the invention. The benefit of facial feature tracking as a method of continuous authentication is a substantially low central processing unit (CPU) load and high tolerance for the position of the user's face relative to the camera. Since the system can lock or start a log off in a very short timer period, the delayed locking timer permits the user to set how quickly the system locks to match the user's usage requirements. This process operates immediately after initial authentication 215 until the device is locked or logged off. If this condition exists, the system will remain unlocked if there is tracking of the user's face or any mouse or keyboard activity. This can be desirable as the locking/logoff action may occur too quickly. Once the mouse or keyboard activity is no longer detected, the method of the invention provides an optional predetermined time period before the device will be locked. If the user's face returns to the field of view or if keyboard/mouse activity is restarted before an inactivity timer expires, then the device will not lock and the timer is reset.

More specifically, the process starts 501 when an authenticated user is granted access to the device which is unlocked 503. A video frame is received from the camera 505 and one or more tracking dots are placed 507 on the prominent features of the user's face. The number of tracking dots are then counted 509 and a determination is made 511 of how many tracking dots are present. If tracking dots meet a minimum threshold, then the process begins again, where the user has been granted access 503 and the device remains unlocked. If the number of tracking dots is below the minimum threshold, the delay locking timer is started 513. The process for using the delayed locking timer is more fully described with regard to FIG. 6. It is next determined 515 whether there is any mouse, keyboard or other peripheral activity such as activity on a touch screen. If there is no activity, the process begins again 503 with the authenticated user having access to an unlocked device. If there is activity on the mouse or keyboard, it is determined 517 whether the delay locking timer 519 has expired. If the delayed locking timer has not expired, the process is restarted 503. If the locking timer has expired, the device is locked 529 and the process is completed 521.

Figure 6:
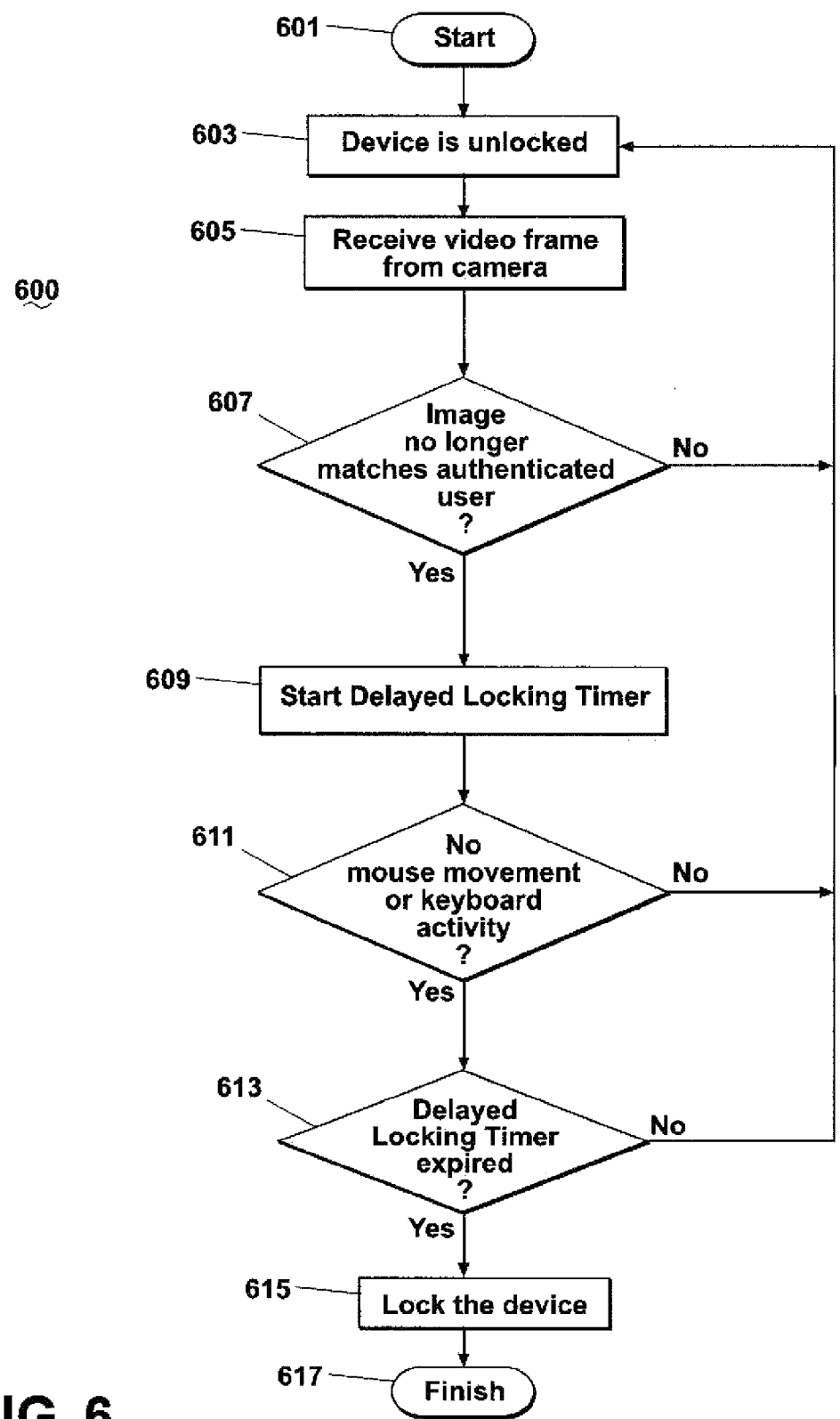
FIG. 6 is a flow chart diagram illustrating an alternative embodiment to the biometric authentication and delayed lock routine shown in FIG. 5 as used in accordance with the invention.

FIG. 6 illustrates a Continuous Biometric Authentication & Delayed Locking flow chart diagram which is an alternative embodiment to the Continuous Facial Feature Tracking and Delayed Lock process 500 as shown in FIG. 5. Although the method described in FIG. 6 is very similar to the tracking feature described in FIG. 5, continuous biometric authentication provides theoretically better security because it is constantly reconfirming the user. In practice the continuous facial feature tracking can lock the system so rapidly that it would be difficult for a new user to replace the existing user before the system locks. Matching database vectors for continuous biometric authentication is very CPU-intensive, and it requires a more consistent placement of the user's face in front of the camera. These two factors make continuous biometric authentication less desirable in many environments and devices. An alternative implementation would include a combination of both Continuous Biometric Authentication and Continuous Facial Feature Tracking where facial feature tracking is performed the majority of the time and Biometric Authentication is run at periodic intervals.

In FIG. 6, a continuous biometric authentication and the delayed lock process 600 are used. The process is started 601 when the user has been granted access 603 to an unlocked device. A video frame from the camera is received 605 and it is determined whether the image matches the authenticated user. If the images do not match, the process begins again with the user continuing access 603 to an unlocked device. If the image does not match that of an authenticated user, a delayed lock timer is started 609 and it is determined 611 whether there is any mouse or keyboard activity. If no activity is present and the delayed lock timer 613 has expired the device will lock or log off 615 and the routine will finish 617. If there is no activity 611 and the delayed locking timer has not expired 613, the device begins again 603. If there is activity 611 or the delayed locking timer 613 has not expired, the process begins again 603.

Thus the system and method of the invention provide fast, simple, and secure access to a personal computer or other electronic device that requires security. The invention uses a camera to continually provide digital images to the electronic device. These images are then compared with those in a database to provide continuous authentication while the user is within the camera's field of view. The invention reduces and/or eliminates the need for a password while providing the user high-level security to text, images, network access, other data or the functionality of the device itself.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A facial biometric recognition system for providing security for an electronic device comprising:
    a digital camera having a field of view for providing a plurality of facial biometric images from a user of the electronic device;
    a database for storing first facial biometric image data after a first user authentication using a password entered using a keyboard associated with the electronic device;
    at least one processor associated with the electronic device for executing the steps of:
        comparing the plurality of facial biometric images to biometric image data stored in the database;
        granting the user operational access to the electronic device;
        updating the database with second facial biometric image data that is more recent in time than the first facial biometric image data if authentication has not occurred within a predetermined period of time and the user provides a second user authentication by entry of a password entered on the keyboard;
        identifying prominent facial features of the user; and
        tracking the prominent facial features when physically moving about the field of view of the digital camera for providing continuous user authentication.

2. A facial biometric recognition system as in claim 1, wherein the plurality of facial biometric images are provided by the digital camera in real-time.

3. A facial biometric recognition system as in claim 1, wherein the plurality of facial biometric images include time stamps.

4. A facial biometric recognition system as in claim 1, further comprising the step of:
    providing authentication credentials to the at least one processor before user facial biometric images are stored in the database.

5. A facial biometric recognition system as in claim 4, wherein the authentication credentials include both a user name and first password.

6. A facial biometric recognition system as in claim 4, wherein the authentication credentials include additional forms of biometric authentication.

7. A facial biometric recognition system as in claim 1, further comprising the step of:
    using a previously stored image for authentication if a real-time facial biometric image cannot be used to provide authentication of the user.

8. A facial biometric recognition system as in claim 7, further comprising the step of:
    using a second password before using a previously stored image.

9. A facial biometric recognition system as in claim 1, further comprising the step of:
    disabling a display of the electronic device when no authentication is made between the real-time facial biometric images and those stored in the database.

10. A facial biometric recognition system as in claim 1, further comprising the step of:
    disabling a display of the electronic device when tracking of the user's presence is lost.

11. A facial biometric recognition system as in claim 10, further comprising the step of:
    delaying disablement of the display for a predetermined time period if use of a peripheral device has been detected.

12. A facial biometric recognition system as in claim 10, wherein the peripheral device is at least one from the group of a mouse, keyboard or touch screen.

13. A facial biometric recognition system as in claim 1, wherein the electronic device is one from the group of personal computer, personal digital assistant (PDA), mobile telephone or gaming device.

14. A facial biometric recognition system as in claim 1, wherein the step of updating includes the step of:
    replacing a biometric image in the database that has resulted in the least success in authentication.

15. A method for providing security for an electronic device using facial biometric information comprising the steps of:
    using a plurality of facial biometric images provided from a digital imaging device;
    utilizing at least one processor for authenticating the identity of the user using a first user authentication by using at least one password entered using a keyboard associated with the electronic device;
    storing digital imaging information about the user in a database;
    updating the database with a new image if authentication has not occurred within a predetermined period of time and the user is later authenticated using a second user authentication by entry of at least one password entered on the keyboard;
    providing continuous user authentication when the user physically moves about a field of view of the digital imaging device by tracking the prominent facial features without comparing facial biometric images; and
    disabling utility of the electronic device if no user authentication is made within a predetermined time period.

16. A method for providing security as in claim 15, wherein the step of providing continuous user authentication includes the step of:
    comparing a real-time image from the digital camera with one stored in the database.

17. A method for providing security as in claim 15, wherein the step of providing continuous user authentication includes the step of:
    detecting the user's presence in field of view of the digital imaging device.

18. A method for providing security as in claim 15, wherein the facial biometric images from the digital imaging device are provided in real-time.

19. A method for providing security as in claim 15, further comprising the step of:
    automatically enrolling a user in the database based on an authentication of a plurality of real-time facial biometric images.

20. A method for providing security as in claim 15, further comprising the steps of:

accessing operation to the electronic device by manually entering first authentication credentials; and populating the database using the plurality of facial biometric images from the digital imaging device obtained after access to the electric device.

21. A method for providing security as in claim 18, further comprising the step of:
providing a time stamp for each of the real-time facial biometric images.

22. A method for providing facial biometric security as in claim 15, wherein the step of updating includes the step of:
replacing a biometric image in the database that has resulted in the least success in authentication.

23. A method for providing facial biometric security as in claim 15, further comprising the step of:
utilizing second authentication credentials independent of the first authentication credentials before updating the database.

24. A method for providing security as in claim 15, further comprising the step of:
delaying the step of disabling if any activity is detected from a peripheral device.

25. A method for providing security as in claim 24, wherein the peripheral device is at least one from the group of keyboard, mouse and touch screen.

26. A method for providing security as in claim 15, wherein the electronic device is at least one from the group of personal computer, personal digital assistant (PDA), mobile telephone or gaming device.

27. A system for providing electronic biometric security for an electronic device comprising:
a camera for providing a plurality of digital images;
a database located in the electronic device for storing digital image information;
at least one microprocessor performing the steps of:
authenticating user identity based on entry of a first password;
storing information in the database from at least one real-time digital image of an authenticated user;
utilizing a previously authenticated image in the database if the real-time digital images stored over a series of frames in a memory cannot be used to provide authentication of the user;
identifying prominent facial features of the user;
tracking the user using the prominent facial features while in a field of view of the camera for providing continuous authentication; and
continuing user access to the electronic device as long as the user remains authenticated.

28. A system for providing electronic security as in claim 27, further comprising the step of:
disabling the tracking step at the option of the user; and
providing a continuous comparison of a real-time image from the camera to an image stored in the database from the authenticated user.

29. A system for providing electronic security as in claim 27, wherein the digital image information includes at least the face of the authenticated user.

30. A system for providing electronic security as in claim 27, further comprising the step of:
disabling the electronic device by using the at least microprocessor if the user is not authenticated.

31. A system for providing electronic security as in claim 30, further comprising the step of:
waiting a predetermined time period before disabling the electronic device.

32. A system for providing electronic security as in claim 30, further comprising the step of:
disabling the electronic display when the electronic device is disabled.

33. A system for providing electronic security as in claim 30, further comprising the step of:
delaying disablement for a predetermined time period if a peripheral device associated with the electronic device is detected.

34. A system for providing electronic security as in claim 27, wherein the step of updating includes the steps of:
time stamping the plurality of digital images when stored in the database;
identifying a digital image stored in the database having an earlier time stamp; and
replacing a digital image in the database that has resulted in the least success in authentication and has the oldest time stamp.

35. A system for providing electronic security as in claim 34, wherein the peripheral device includes at least one from the group of a mouse, keyboard or touch screen.

36. A system for providing electronic security as in claim 27, wherein the electronic device is at least one from the group of personal computer (PC), personal digital assistant (PDA), cellular telephone or gaming device.

37. An electronic device using facial biometric security for providing access to the electronic device comprising:
a digital camera for providing a plurality of real-time user images;
a database for storing at least one of the plurality of user images after the user has entered first valid authentication credentials such that a biometric image that has been stored the longest time and has resulted in the least success in authentication is the first replaced;
a microprocessor for comparing the plurality of user images with the at least one image stored in the memory for providing user authentication; and
wherein the microprocessor performs the steps of:
granting access to the electronic device when the user is authenticated;
utilizing a previously authenticated image in the database if the real-time digital images stored over a series of frames in memory cannot be used to provide authentication of the user;
identifying prominent facial features of the user; and
tracking the user using the prominent facial features when physically moving about the field of view of the digital camera for providing a continuous authentication without comparing user images.

38. An electronic device using facial biometric security as in claim 37, further comprising the step of: time stamping the plurality of user images.

39. An electronic device as in claim 38, further comprising the step of:
updating the memory after the user has entered valid authentication credentials with the user's image having a previous time stamp if the user is not authenticated within a predetermined time period.

40. An electronic device as in claim 37, wherein the authentication credentials include at least one password.

41. An electronic device as in claim 37, further comprising the step of:
disabling the functionality of the electronic device if the user is not authenticated within a predetermined time period; and
re-enabling functionality of the device when the user is again authenticated.

42. An electronic device as in claim 41, further comprising the step of:
delaying disablement is delayed if a peripheral device associated with the electronic device is detected as in use.

43. An electronic device as in claim 42, wherein the peripheral device is at least one from the group of mouse, keyboard or touch screen.

44. An electronic device as in claim 37, wherein the electronic device is at least one of a personal computer (PC), personal digital assistant (PDA), cellular telephone or gaming device.

45. A method for providing security for a user of a personal computer (PC) using facial biometrics comprising the steps of:
- receiving from a digital camera a plurality of substantially real-time facial biometric images of a user stored in memory;
- manually entering first authentication credentials using a password entered using a keyboard for providing access to the PC;
- enrolling the user with at least one first stored image into a database if the first authentication credentials are valid;
- updating the database with a second stored image if authentication has not occurred within a predetermined period of time and the user is later authenticated using second authentication credentials entered using a password entered with the keyboard;
- replacing a biometric image in the memory from one in the database that has been stored the longest time and has resulted in the least success in authentication;
- identifying prominent facial features of the user;
- tracking the prominent facial features for providing substantially continuous authentication while the user remains within a field of view of the digital camera; and
- allowing the user continued access to the PC as long as the user remains authenticated.

46. A method using the facial biometric images for providing security for a PC as in claim 45, further comprising the step of:
- using a facial biometric image as the first stored image.

47. A method for providing security for a PC as in claim 45, further comprising the step of:
- disabling a predetermined functionality of the PC if authentication has not been achieved within a predetermined time period.

48. A method for providing security for a PC as in claim 47, wherein the step of disabling includes providing a non-functional display.

49. A method for providing security for a PC as in claim 48, further comprising the step of:
- delaying disablement of the display upon detection of a use of a peripheral device associated with the PC.

50. A method for providing security for a PC as in claim 49, wherein the peripheral device is a keyboard.

51. A method for providing security for a PC as in claim 49, wherein the peripheral device is a mouse.

52. A method for providing security for a PC as in claim 45, wherein the method is embodied in non-transitory machine readable software code executed on a personal computer.

53. A non-transitory computer readable medium having computer readable instructions stored thereon for execution by a processor to perform a method comprising the steps of:
- using a plurality of facial biometric images provided from a digital imaging device input into a memory;
- utilizing at least one processor for authenticating the identity of the user using a first user authentication having a password entered from a keyboard;
- storing digital imaging information about the user in a database;
- providing continuous user authentication when the user physically moves about a field of view of the digital imaging device by tracking the prominent facial features without comparing facial biometric images by comparing a real-time image from the digital camera with one stored in the database and updating the database with a new image if authentication has not occurred within a predetermined period of time and the user is later authenticated using a second user authentication entered using a password on the keyboard;
- replacing a biometric image in the memory from one in the database that has been stored the longest time and has resulted in the least success in authentication; and
- disabling utility of the electronic device if no user authentication is made within a predetermined time period.

54. A computer readable medium as in claim 53, wherein the step of providing continuous user authentication includes the step of:
- detecting the user's prominent facial features in field of view of the digital imaging device.

55. A computer readable medium as in claim 53, further comprising the step of:
- automatically enrolling a user in the database based on an authentication of a plurality of real-time facial biometric images.

56. A computer readable medium as in claim 53, further comprising the steps of:
- accessing operation to the electronic device by manually entering first authentication credentials; and
- populating the database using the plurality of facial biometric images from the digital imaging device obtained after access to the electric device.

57. A computer readable medium as in claim 53, further comprising the step of:
- providing a time stamp for each of the real-time facial biometric images.

58. A computer readable medium as in claim 57, further comprising the steps of:
- identifying a facial biometric image stored in the database having an earlier time stamp; and
- updating the database with the biometric image having the earlier time stamp if the real-time facial biometric images cannot be used to authenticate a user within a predetermined time period.

59. A computer readable medium as in claim 57, wherein the step of updating includes the step of:
- replacing a biometric image in the database that has resulted in the least success in authentication and has the oldest time stamp.

60. A computer readable medium as in claim 56, further comprising the step of:
- utilizing second authentication credentials independent of the first authentication credentials before updating the database.

61. A computer readable medium as in claim 53, further comprising the step of:
- delaying the step of disabling if any activity is detected from a peripheral device.

62. A computer readable medium as in claim 53, wherein the peripheral device is at least one from the group of keyboard, mouse and touch screen.

63. A computer readable medium as in claim 53, wherein the electronic device is at least one from the group of personal computer, personal digital assistant (PDA), mobile telephone or gaming device.

* * * * *